(12) United States Patent
Kolstad et al.

(10) Patent No.: US 7,216,811 B2
(45) Date of Patent: May 15, 2007

(54) BARCODE SCANNER WITH LINEAR AUTOMATIC GAIN CONTROL (AGC), MODULATION TRANSFER FUNCTION DETECTOR, AND SELECTABLE NOISE FILTER

(75) Inventors: Jesse J. Kolstad, Fife, WA (US); Bryan L. Davis, Ravensdale, WA (US)

(73) Assignee: Microscan Systems Incorporated, Renton, WA (US)

( * ) Notice: Subject to any disclaimer, the term of this patent is extended or adjusted under 35 U.S.C. 154(b) by 224 days.

(21) Appl. No.: 10/825,944

(22) Filed: Apr. 16, 2004

(65) Prior Publication Data

US 2005/0230480 A1 Oct. 20, 2005

(51) Int. Cl.
*G06K 7/10* (2006.01)
(52) U.S. Cl. .............................. 235/462.26; 235/472.01
(58) Field of Classification Search ...............................
235/462.01–462.45, 472.01, 472.02, 472.03, 235/454, 456, 455; 250/235
See application file for complete search history.

(56) References Cited

U.S. PATENT DOCUMENTS 5,126,545 A * 6/1992 Barkan .................. 235/462.25
5,371,361 A * 12/1994 Arends et al. ............... 250/235
5,548,109 A * 8/1996 Butturini et al. ........ 235/462.27
5,705,800 A * 1/1998 Dvorkis et al. ......... 235/462.08
5,777,311 A * 7/1998 Keinath et al. ......... 235/462.27
5,945,658 A * 8/1999 Salatto et al. .......... 235/462.22
6,502,751 B1 * 1/2003 Tang ...................... 235/462.25
6,811,087 B2 * 11/2004 Nakamura et al. ..... 235/462.26

\* cited by examiner

*Primary Examiner*—Thien M. Le
(74) *Attorney, Agent, or Firm*—Blakely, Sokoloff, Taylor & Zafman LLP

(57) ABSTRACT

According to embodiments of the present invention, a barcode scanner platform is provided in which the gain of an analog signal representative of a barcode is controlled using a control loop. In embodiments, an MTF detector generates a value (e.g., DC) representative of a low frequency portion (wide or out of optical focus elements) of the analog signal and a second value (e.g., DC) representative of a high frequency portion (narrow elements or in optical focus elements) of the analog signal. The processor uses the first and the second values and a reference amplitude to determine a gain signal. The processor provides the gain signal to an AGC circuit that provides a linear response to the gain signal using matched JFETs. A noise filter can be enabled or disabled based on the first value, the second value, and/or the barcode scanner platform read rate.

70 Claims, 7 Drawing Sheets

BARCODE SCANNER WITH LINEAR AUTOMATIC GAIN CONTROL (AGC), MODULATION TRANSFER FUNCTION DETECTOR, AND SELECTABLE NOISE FILTER

BACKGROUND

1. Field

Embodiments of the present invention relate to barcode scanners and, in particular, to signal conditioning in barcode scanners.

2. Discussion of Related Art

Barcodes have many uses including identifying consumer goods. Merchants affix barcodes to the goods and at checkout, for example, and the barcode is scanned to reveal the price of the particular goods. FIG. 1 is a high-level block diagram of a barcode-scanning platform 100. The platform 100 includes a barcode 102 that is scanned using a scanner 104 that emits an optical signal 105. A modulated optical signal 107 is reflected off the barcode 102 and a photodetector and input stage 106 converts the modulated optical signal 107 to an analog signal 108 representative of the barcode 102. A signal conditioner 110 processes the analog signal 108 and generates a digital signal 112 representative of the barcode 102.

The example barcode 102 includes series of bars 120 and spaces 122 of different contrast and widths. The particular placement and width of the bars 120 and spaces 122 form a code, which can be decoded to provide meaningful information to a user of the platform 100.

In the illustrated embodiment, the bars 120 are darker than the spaces 122. Because the bars 120 are darker than the spaces 122, the bars 120 are more absorptive and less reflective than the spaces 122. As a result, the bars 120 produce negative peaks in the analog signal 108 and the spaces produce positive peaks in the analog signal 108.

The optical signal 105 is generally a focused optical "spot" that scans the barcode, and the size of the spot affects the reading of the barcode 102. For example, if the optical spot size is smaller than the smallest bar 120 or space 122, then the optical signal 105 is said to be within optical "focus" and the analog signal 108 can be a fairly good representation of the barcode 102. One characteristic of a "focused" signal is the positive and negative peaks in the analog signal 108 for the narrowest bars 120A and spaces 122B are the same amplitude as for the wider bars 120C and spaces 122C.

As the scanning laser 104 is moved away from optical focus (e.g. farther from or nearer to the barcode 102) the optical spot size becomes larger. With the larger optical spot, the energy in the optical signal 105 is distributed across adjacent bars 120 and spaces 122 so that no one particular bar 120 absorbs all the available energy or no one particular space reflects all the available energy. As a result, the negative and positive peaks for the narrowest bars (e.g., 120A and 120D) and narrowest spaces (e.g., 122B) have less amplitude than for the wider bars 122C and spaces 122C.

One characteristic of barcode scanning platforms and the focus point is that sometimes the amplitudes of the portions of the analog signal 108 associated with the narrow bars and spaces are different from (e.g., less than) the amplitudes of the portions of the analog signal 108 associated with the wider bars and spaces. This commonly occurs when the optical spot size is larger than the narrowest bars and spaces. The ratio of amplitudes of the portions of the analog signal 108 associated with the narrow bars and spaces to the amplitudes of the portions of the analog signal 108 associated with the wide bars and spaces is referred to as a "modulation transfer function" or MTF and it can be used to describe the characteristics of the analog signal 108. For example, when the MTF is less than one hundred percent (100%), it can be difficult for the analog signal 108 to be accurately resolved into a digital signal representative of the barcode 102.

Another characteristic of barcode scanning platforms is that as the optical spot size becomes so small (e.g., at the focus point), the energy in the optical signal 105 is more concentrated on the material carrying the barcode 102 (e.g., paper fibers, wood shavings, metal pits and grains, etc.). The fibers, grains, pits, etc. themselves begin to absorb and/or reflect the energy in the optical signal 105 and cause what is commonly referred to as "paper noise." Paper noise tends to degrade the signal-to-noise ratio (SNR) of the analog signal 108. Other noises can also be introduced in the platform. When the SNR of the analog signal 108 is degraded, it can be difficult for the analog signal 108 to be accurately resolved into a digital signal representative of the barcode 102.

Still another characteristic of barcode-scanning platforms is that the analog signal 108 should maintain constant amplitude in order to be accurately resolved into a digital signal representative of the barcode 102. Automatic gain control circuits are traditionally used to maintain the amplitude constant. However, many known automatic gain control techniques require complex control equations and high cost circuits.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
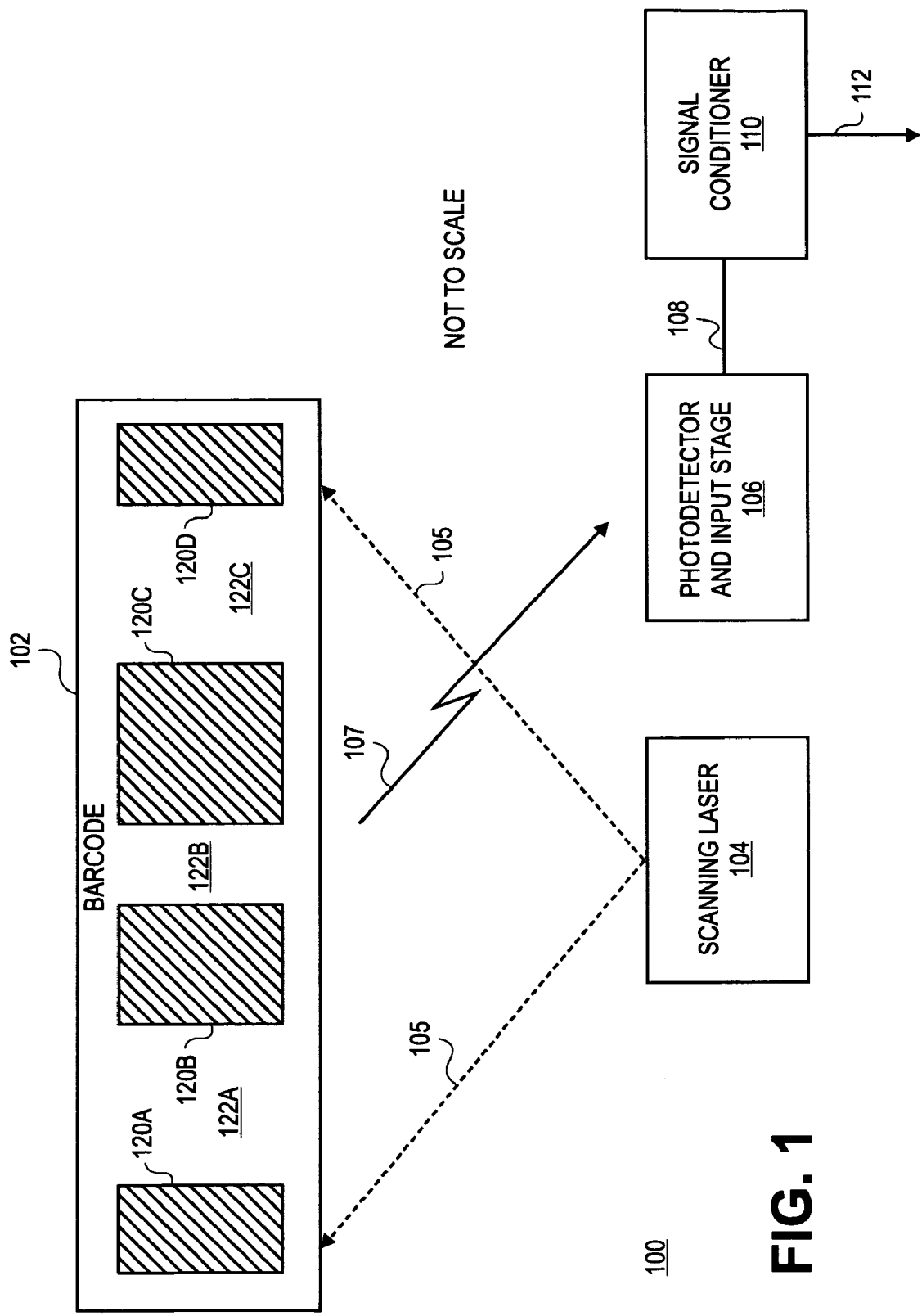
FIG. 1 is a high-level block diagram of a barcode scanning platform.
Figure 2:
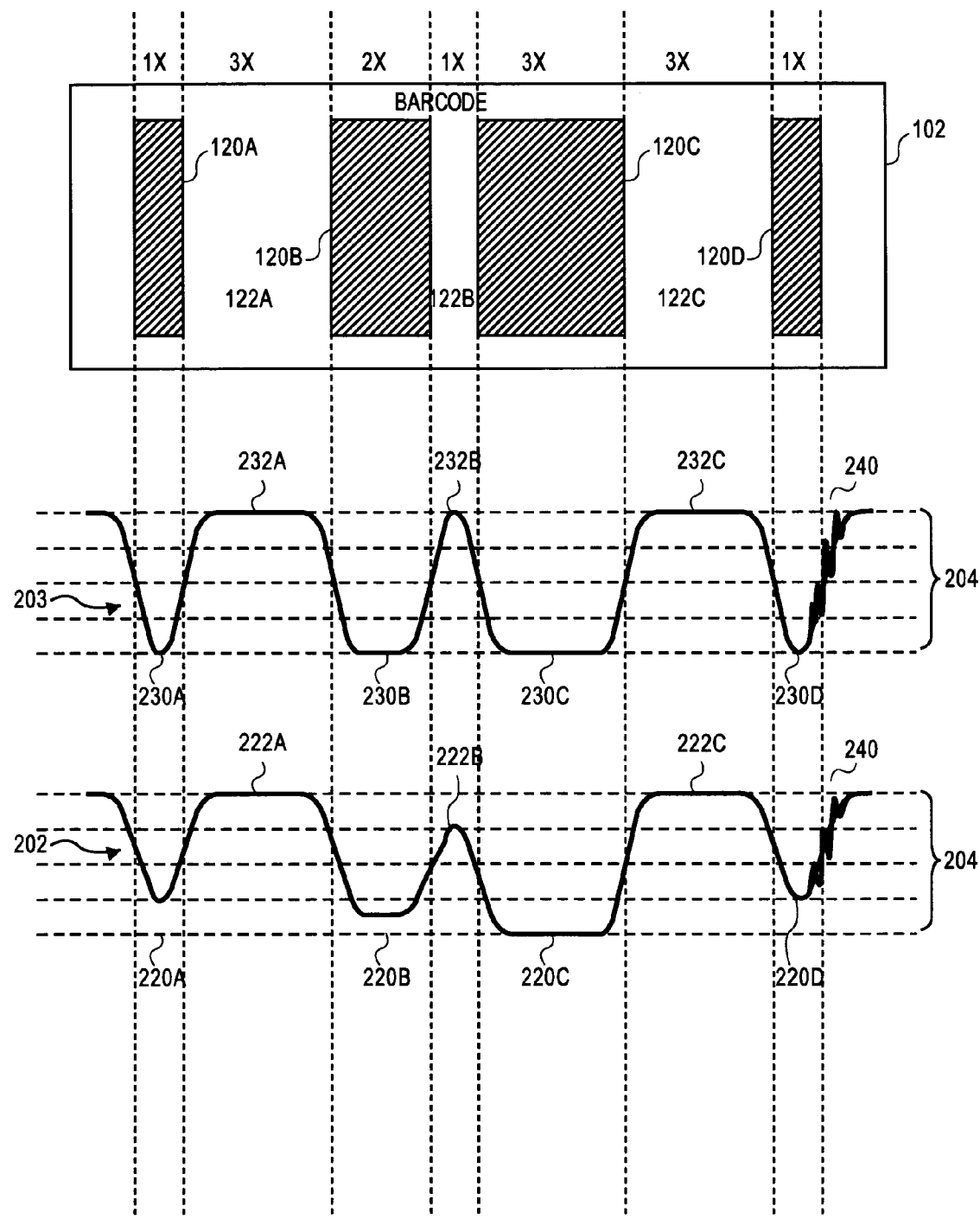
FIG. 2 is a graphical representation showing analog signals representative of a barcode and their relationship to the barcode according to an embodiment of the present invention.

FIG. 2 is a graphical representation showing analog signals 202 and 203 representative of the barcode 102 and their relationship to the barcode 102 with respect to a reference amplitude 204 (e.g., peak-to-peak amplitude) for the analog signals 202 and 203 according to an embodiment of the present invention. In the illustrated embodiment, the analog signal 202 is a modulated signal that includes negative peaks 220 (e.g., 220A, 220B, 220C, and 220D), and positive peaks 222 (e.g., 222A, 222B, and 222C). The negative peaks 220 are representative of the bars 120 and the positive peaks 222 are representative of the spaces 122. The analog signal 203 is a modulated signal that includes negative peaks 230 (e.g., 230A, 230B, 230C, and 230D), and positive peaks 232 (e.g., 232A, 232B, and 232C). The negative peaks 230 are representative of the bars 120 and the positive peaks 232 are representative of the spaces 122. In the illustrated embodiment, the analog signal 203 has a modulation transfer function of approximately one hundred percent (100%) and the analog signal 202 has a modulation transfer function of less than approximately one hundred percent (100%).

The bar 120A is the same width as the bar 120D (e.g. 1× element width) and is narrower than the bar 120B (e.g. 2× element width). Both the bars 120D and 120B are narrower than the bar 120C (3× element width). The space 122B (e.g. 1× element width) is narrower than the space 122A (e.g. 3× element width) and 122C (e.g. also 3× element width).

In the example analog signal 203, all of the peaks 230 and 232 have amplitudes approximately equal to the reference amplitude 204. All of the peaks 230 and 232 have approximately the same amplitudes (e.g. because the modulation transfer function is approximately equal to one hundred percent (100%)). Some of the peaks 230 and 232 have different periods (e.g. fundamental frequencies) from each other resulting from the different element sizes (e.g. 1×, 2×, 3×).

In the illustrated embodiment, the analog signal 203, the period of the peaks 230A, 230D and 232B are shorter than the period of the peak 230B, 230C, 232A, and 232C. The periods of the peaks 230A, 230B, 230D, and 232B are all shorter than the periods of peaks 230C, 232A, and 232C. The example analog signal 203 has a modulation transfer function that is approximately equal to one hundred percent (100%)), so despite the differences in size of the barcode 102 elements 120 and 122, and thus the differences in the periods of the associated peaks, the positive peaks 232 and negative peaks 230 have amplitudes that are approximately equal.

In the example analog signal 202, some of the peaks 220 and 222 have amplitudes different than the reference amplitude 204. Some of the peaks 220 and 222 have amplitudes that are different from each other (e.g. because the modulation transfer function is less than one hundred percent (<100%) due to optical spot focus and/or electronic bandwidth). Some of the peaks 220 and 222 have different periods (e.g. fundamental frequencies) from each other resulting from the different element sizes (e.g. 1×, 2×, 3×).

In the example analog signal 202, the periods of the peaks 220A, 220D, and 222B are shorter than the period of the peak 220B. The periods of the peaks 220A, 220B, 220D, and 222B are shorter than the periods of the peaks 220C, 222A, and 222C.

Figure 3:
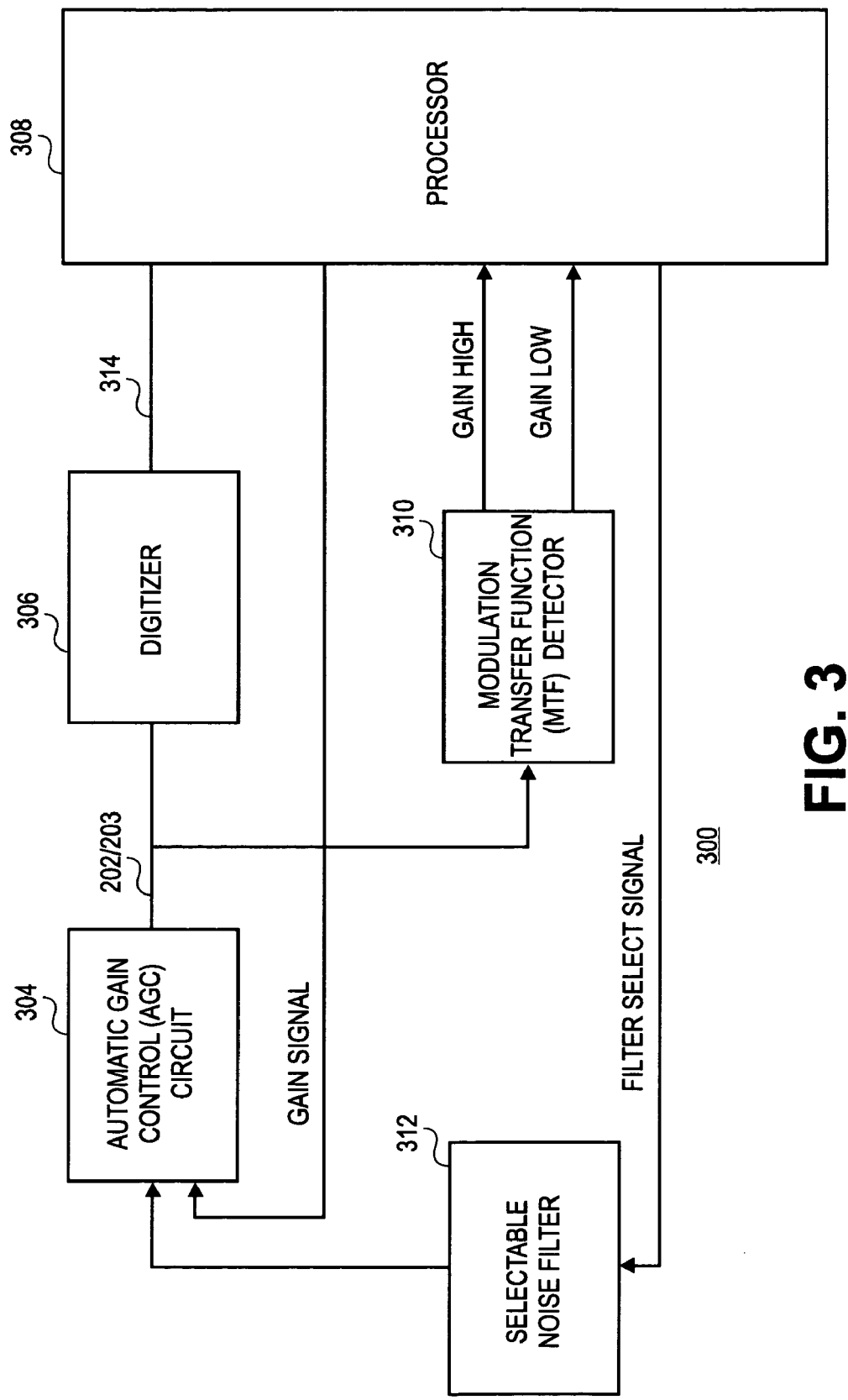
FIG. 3 is a high-level block diagram of a signal conditioner according to an embodiment of the present invention.

FIG. 3 is a high-level block diagram of a signal conditioner 300 according to an embodiment of the present invention, which is a control loop that amplifies or attenuates some or all of peaks 230 and 232, and 220 and 222. The signal conditioner 300 also can selectively filter out noise from the analog signal 202/203.

The signal conditioner 300 in the illustrated embodiment includes an automatic gain control circuit (AGC) circuit 304 whose output is coupled to a digitizer 306. The output of the digitizer 306 is coupled to a processor 308. A modulation transfer function (MTF) detector 310 is coupled to tap a portion of the analog signal 202/203. A selectable noise filter 312 is coupled to the input of the AGC circuit 304 and to the processor 308.

The AGC circuit 304 can provide a linear response to an input and can amplify or attenuate the analog signal 202/203 accordingly. Implementation of the AGC circuit 304 according to embodiments of the present invention is described in more detail below with reference to FIGS. 4 and 5.

The digitizer 306 receives the analog signal 202/203 and can convert it to a digital signal 314 (e.g. square wave) representative of the barcode 102. In one embodiment, the performance of the digitizer 306 is optimum when the analog signal 202/203 is within the reference amplitude 204. Circuitry suitable for implementing the digitizer 306 is known.

The MTF detector 310 detects peak amplitudes of at least one low frequency portion of the analog signal 202/203 and peak amplitudes of at least one high frequency portion of the analog signal 202/203. The MTF detector 310 can generate a Gain Low signal, which in one embodiment is a direct current (DC) level representative of the low frequency peaks in the analog signal 202/203. The MTF detector also can generate a Gain High signal, which in one embodiment is a DC level representative of the high frequency peaks in the analog signal 202/203. Of course, Gain Low and Gain High signals can be any suitable signals that are representative of the low and high frequency peaks, respectively, in the analog signal 202/203. Implementation of the MTF detector 310 according to embodiments of the present invention is described in more detail below with reference to FIG. 6.

The selectable noise filter 312 can be coupled to the input of the AGC circuit 304 to attenuate noise and/or improve signal-to-noise ratio (SNR) of the analog signal 202/203. Implementation of the selectable noise filter 312 according to embodiments of the present invention is described in more detail below with reference to FIGS. 5 and 7.

In embodiments of the present invention, the processor 308 can decode the digital signal 314, can measure and convert the Gain High signal and the Gain Low signal into digital values, measure the digital values, compare the digital values to the reference amplitude 204, and determine whether the analog signal 202/203 should be amplified, or attenuated, or remain the same. After reading the description herein, it will become apparent to a person of ordinary skill in the relevant art how to implement the processor 308 according to embodiments of the present invention.

Figure 4:
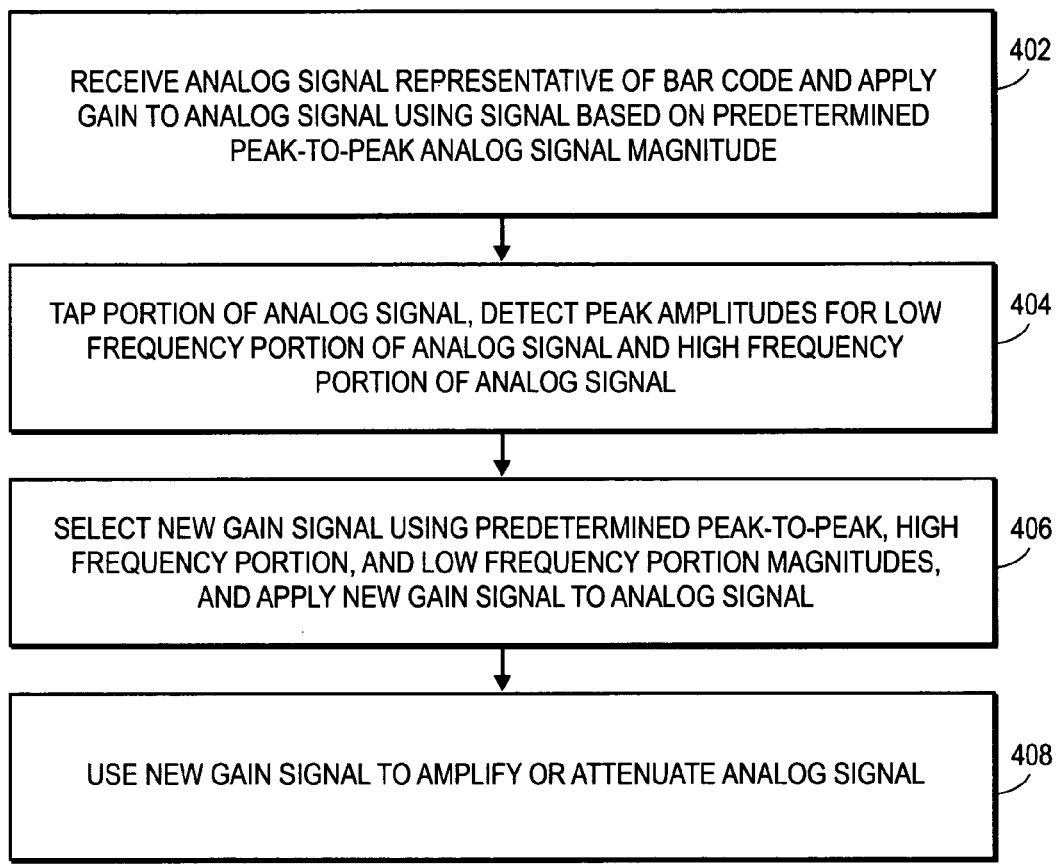
FIG. 4 is a flowchart illustrating an approach to implementing the signal conditioner depicted in FIG. 3 according to an embodiment of the present invention.

FIG. 4 is a flowchart illustrating a process 400 implemented by the signal conditioner 300 according to an embodiment of the present invention. The operations of the process 400 are described as multiple discrete blocks performed in turn in a manner that is most helpful in understanding embodiments of the invention. However, the order in which they are described should not be construed to imply that these operations are necessarily order dependent or that the operations be performed in the order in which the blocks are presented.

Of course, the process 400 is only an example process and other processes may be used to implement embodiments of the present invention. A machine-accessible medium with machine-readable instructions thereon may be used to cause a machine (e.g., a processor) to perform the process 400.

In a block 402, the AGC circuit 304 receives the analog signal 202/203 from the photodetector and the input stage 106 and applies gain or attenuation to the analog signal 202/203 based on the reference amplitude 204. In one embodiment, the processor 308 provides a gain signal representative of the reference amplitude 204 to the AGC circuit 304, which uses the gain signal as the basis for amplifying or attenuating the analog signal 202/203.

In a block 404, the MTF detector 310 taps a portion of the analog signal 202/203, detects peak amplitudes of at least one low frequency portion of the analog signal 202/203, and detects peak amplitudes of at least one high frequency portion of the analog signal 202/203.

In a block 406, the processor 308 selects a new gain signal based on an algorithm that relates the reference amplitude 204, the Gain High signal, and the Gain Low signal, and provides the new gain signal to the AGC circuit 304. In one embodiment, the processor 308 determines that the Gain High signal is disproportionately less than the Gain Low signal and the reference amplitude 204. In this embodiment, the new gain signal can inform the AGC circuit 304 to amplify the analog signal 202/203 regardless of whether such amplification will cause the Gain Low signal to exceed the reference amplitude 204.

In an alternative embodiment, the Gain Low signal is approximately equal to the Gain High signal, but the analog signal 202/203 is less than the reference amplitude 204. In this embodiment, the new gain signal can inform the AGC circuit 304 to amplify the analog signal 202/203 to bring it within the reference amplitude 204. Of course, other amplification and attenuation schemes are possible and after reading the description herein a person of ordinary skill in the relevant are will readily recognize how to implement embodiments of the present invention for various combinations of Gain High, Gain Low, and reference amplitude 204 values.

In a block 408, the AGC circuit 304 uses the new gain signal as a basis for amplifying or attenuating the analog signal 202/203.

Figure 5:
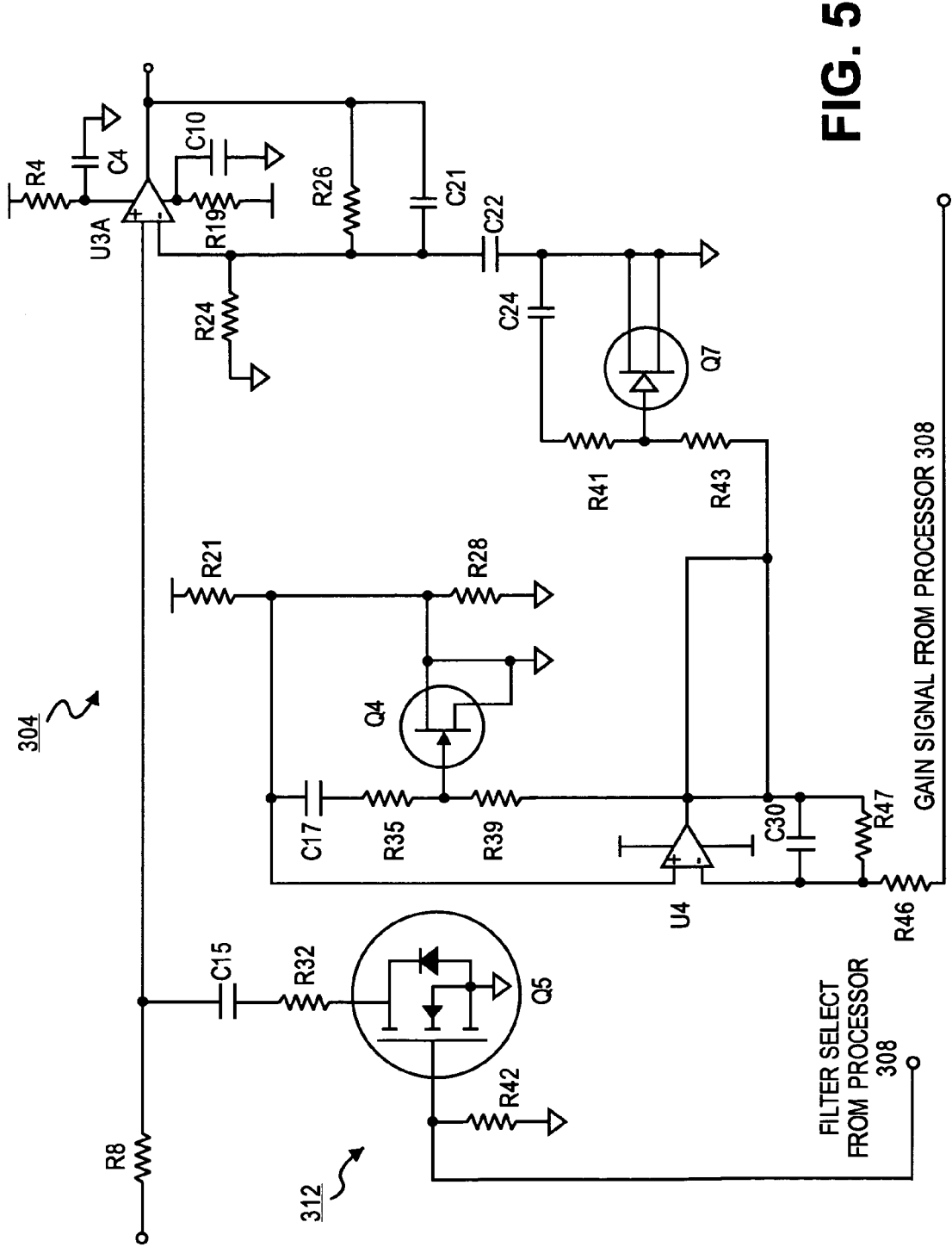
FIG. 5 is a schematic diagram of the selectable noise filter and an automatic gain control circuit according to an embodiment of the present invention.

FIG. 5 is a schematic diagram of the AGC circuit 304 according to an embodiment of the present invention. In the illustrated embodiment, the AGC circuit 308 includes capacitors C4 (0.1 µF), C10 (0.1 µF), C15 (39 pF), C17 (0.1 µF), C21 (12 pF), C22 (30 µF), C24 (580 pF), and C30 (100 pF), operational amplifiers U3A (non-inverting) and U4 (inverting), transistors Q4 (compensation junction field-effect transistor (JFET), and Q7 (gain JFET, acting as a voltage-controlled resistor), resistors R4 (24Ω), R8 (5.1 KΩ), R19 (24Ω), R21 (10 KΩ), R24 (24Ω), R26 (10 KΩ), R28 (4.7 KΩ), R32 (20 KΩ), R35 (100 KΩ), R39 (100 KΩ), R41 (100 KΩ), R43 (100 kΩ), R46 (8.2 KΩ), and R47 (10 KΩ).

C21 provides a high-frequency compensation filter to roll off noise and provide signal stability for amplifier U3A. C22 and R24 provide a low-frequency DC blocking filter to reduce bias voltages for U4 and FET Q7 from interacting to produce inappropriate DC output offset and asymmetry for the analog signal 202/203. R19 and C10, R4, and C4 are power supply (e.g., 5 volts) filters for U3A. R26 and the equivalent resistance of JFET Q7 determine the gain of U3A. JFET Q4 and Q7 are matched transistors. R41, R43, and C24 are bias elements for the main gain JFET Q7. R35, R39, and C17 are similar bias elements for the regulating JFET Q4. R21 and R28 provide similar impedance to Q4 that would be seen by Q7. U4 drives the gates of Q7 and Q4 and is controlled with an analog signal from the processor 308. R47, R46, and C30 allow gain adjustment for exact desired JFET gate control.

The gain signal from the processor 308 controls U4. U4 buffers the gain signal and drives JFET Q7 and JFET Q4. The JFET Q4 is in the positive feedback path of U4. Based on the gain signal from the processor 308, U4 outputs the gate voltage to JFET Q7, which responds according to its characteristic curve providing an equivalent resistance. U4 also outputs the gate voltage to JFET Q4, which, too, responds in accordance with its characteristic curve and provides a regulating response back to U4.

Because the JFET Q4 is driven by and loaded with similar impedances as JFET Q7, and because it is in the regulating feedback path of U4, the output from the AGC circuit 304 can be linear over a very wide dynamic range (which in turn results in a very wide range of reading distances, e.g., close to the barcode 102 and far away from the barcode 102). Unlike other known circuitry that requires complex control equations to implement and often limit predictive gain adjustments, the AGC circuit 304 implemented according to embodiments of the present invention uses inexpensive matched JFETs to linearize the response to the gain signal input. As a result, the response of the AGC circuit 304 to the gain signal from the processor 308 can be predicted and deterministic.

In an alternative embodiment in which the AGC circuit 304 can attenuate the analog signal 202/203, the AGC circuit 304 includes JFET Q7 coupled right after R8. In this embodiment, JFET Q7 drain is coupled to ground, creating a voltage divider between R8 and the equivalent resistance of JFET Q7 that provides the divided voltage onto the positive input of U3A.

In still another embodiment of the present invention, the AGC circuit 304 includes only one JFET Q7 in which its non-linear response (e.g., response curve) is mapped by the processor 308. The mapped values are stored (e.g., in a lookup table) and the processor 308 uses the mapped values to generate the same predictive gain adjustment.

Although embodiments of the present invention are described with reference to Q4 and Q7 being JFETs, embodiments of the present invention are not so limited. For example, Q4 and/or Q7 can be any suitable gain element including, but not limited to, bipolar junction transistor (BJT), a MOSFET, vacuum tube, a gallium arsenide (GaAs) FET, a heterojunction bipolar junction transistor (HBJT), and the like. After reading the description herein, it will become apparent to a person of ordinary skill in the relevant art how to implement Q4 and Q7 in various other embodiments of the present invention.

Figure 6:
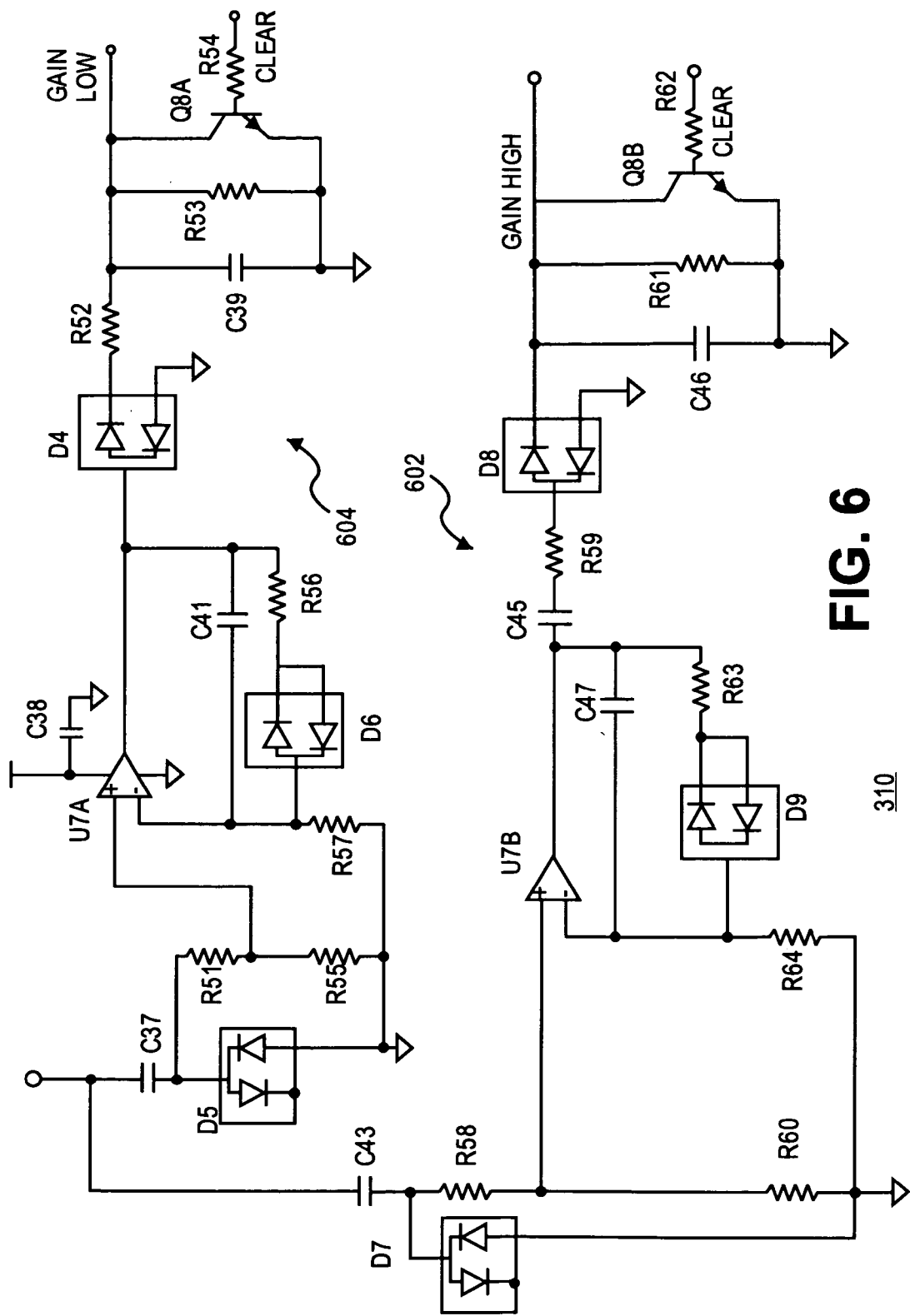
FIG. 6 is a schematic diagram of the MTF detector depicted in FIG. 3 according to an embodiment of the present invention.

Referring back to FIG. 4, recall that in the block 404, the MTF detector 310 taps a portion of the analog signal 202/203, detects peak amplitudes of at least one frequency portion (e.g., low frequencies) of the analog signal 202/203, and detects peak amplitudes of at least one other frequency portion (e.g., high frequencies) of the analog signal 202/203. FIG. 6 is a schematic diagram of the MTF detector 310 according to an embodiment of the present invention. In the illustrated embodiment, the MTF detector 310 includes two frequency detection circuits 602 and 604. In one embodiment, the frequency detection circuit 602 detects higher frequencies within the analog signal 202/203 in the range of approximately a few hundred kilohertz to approximately several hundred kilohertz. In another embodiment, the frequency detection circuit 604 detects lower frequencies within the analog signal 202/203 in the range of approximately a few tens of kilohertz to approximately a few hundred kilohertz.

Of course, embodiments of the present invention are not limited to detecting only two or only these particular two frequency ranges within analog signals representative of barcodes. For example, several and different frequency ranges can be detected and provided to the processor 308 (e.g., one frequency range can be within another frequency range). After reading the description herein a person of ordinary skill in the relevant art will readily recognize how to implement embodiments of the present invention for more and other frequency ranges.

In the illustrated embodiment, the frequency detection circuit 604 includes capacitors C37 (580 pF), C38 (0.1 µF), C39 (200 pF), and C41 (8.2 pF), diodes D4, D5, and D6, amplifier U7A, transistor Q8A, and resistors R51 (10 KΩ), R52 (100 KΩ), R53 (120 KΩ), R54 (330Ω), R55 (1 KΩ), R56 (10 KΩ), and R57 (1 KΩ). The tapped analog signal 202/203 enters the frequency detection circuit 604 through C37 and D5. C37 and D5 rectify the analog signal 202/203 to ground. C37, R51, and R55 provide for signal loading isolation and the low-end cut-off frequency for the frequency detection circuit 604. U7A amplifies the analog signal 202/203. The combination of U7A, D4, and D6 detects the peak amplitudes in the analog signal 202/203 that fall within the bandwidth of the frequency detection circuit 604.

C39 and R53 provide a hold time constant and develop a charge based on the peak values of the portions of the analog signal 202/203 that are within the bandwidth of the frequency detection circuit 604. The charge on C39 is the Gain Low signal sent to the processor 308. The processor 308 provides a signal on the base of Q8A through R54 to clear the charge on C39, and thus reset the Gain Low signal, after a new gain signal has been sent to the AGC circuit 304.

In the illustrated embodiment, the frequency detection circuit 602 includes capacitors C43 (68 pF), C45 (0.015 µF), C46 (200 pF), and C47 (8.2 pF), diodes D7, D8, and D9, amplifier U7B, transistor Q8B, and resistors R58 (10 KΩ), R59 (100Ω), R60 (1 KΩ), R61 (200 KΩ), R62 (330Ω), R63 (10 KΩ), and R64 (510Ω). The tapped analog signal 202/203 enters the frequency detection circuit 602 through C43 and D7. C43 and D7 rectify the analog signal 202/203 to ground. C43, R58, and R60 provide for signal loading isolation and the low-end cut-off frequency for the frequency detection circuit 602. U7A amplifies the analog signal 202/203. C45 and R59 provide an additional low-end cut-off frequency for the frequency detection circuit 602. The combination of U7B, D8, and D9 detects the peak amplitudes in the analog signal 202/203 that fall within the bandwidth of the frequency detection circuit 602.

C46 and R61 provide a hold time constant and develop a charge based on the peak values of the portions of the analog signal 202/203 that are within the bandwidth of the frequency detection circuit 602. The charge on C46 is the Gain High signal sent to the processor 308. The processor 308 provides a signal on the base of Q8B through R62 to clear the charge on C46, and thus reset the Gain High signal, after a new gain signal has been sent to the AGC circuit 304.

Figure 7:
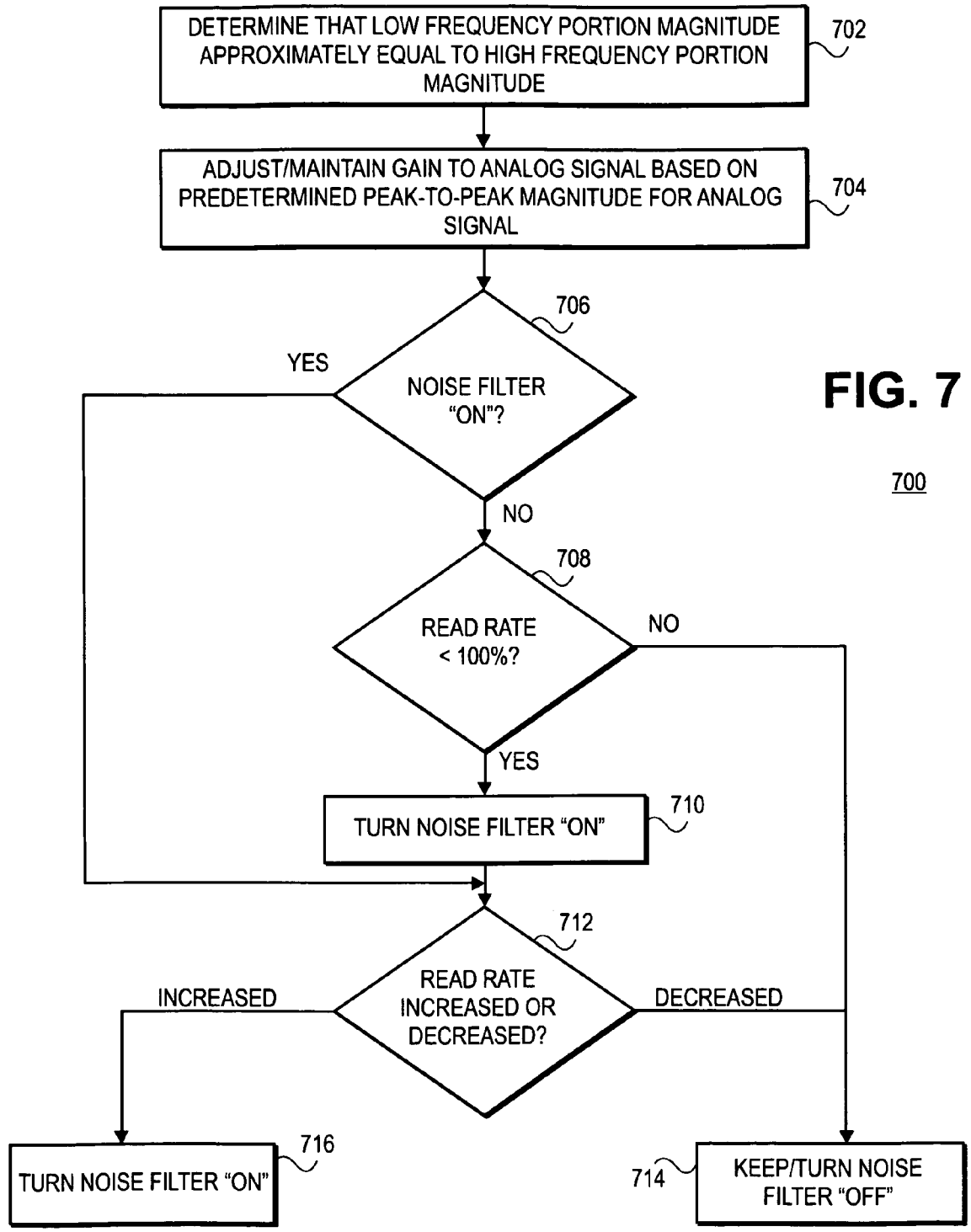
FIG. 7 is a flowchart illustrating an approach to implementing the selectable noise filter depicted in FIG. 3 according to an embodiment of the present invention.

FIG. 7 is a flowchart illustrating process 700 for implementing the selectable noise filter 312 according to an embodiment of the present invention. The operations of the process 700 are described as multiple discrete blocks performed in turn in a manner that is most helpful in understanding embodiments of the invention. However, the order in which they are described should not be construed to imply that these operations are necessarily order dependent or that the operations be performed in the order in which the blocks are presented.

Of course, the process 700 is only an example process and other processes may be used to implement embodiments of the present invention. A machine-accessible medium with machine-readable instructions thereon may be used to cause a machine (e.g., a processor) to perform the process 700. In one embodiment, a user can manually implement the process 700.

In a block 702, the processor 308 determines that the Gain Low signal is approximately equal to the Gain High signal.

In a block 704, the processor 308 applies a new gain signal to the AGC circuit 304, which informs the AGC circuit 304 to amplify/attenuate/maintain the analog signal 202/203 (to bring it to) within the reference amplitude 204.

In a block 706, the processor 308 determines whether the selectable noise filter 312 is ON or OFF.

If the selectable noise filter 312 is OFF, then in a block 708, the processor 308 determines whether the read rate for the platform 100 is less than a predetermined value (e.g., less than approximately one hundred percent (<100%)). As used herein, read rate is defined as the number of successful decodes of the analog signal 202/203 per number of attempted reads (e.g. ten successful decodes out of ten attempted reads is one hundred percent read rate). If the read rate is less than the predetermined value, then the processor 308 turns the selectable noise filter 3120N.

In a block 712, the processor 308 determines whether the read rate increased or decreased. If the read rate decreases, then in a block 714, the processor 308 turns the selectable noise filter 312 OFF. If the read rate increases, then in a block 716, the processor 308 permits the selectable noise filter 312 to remain ON.

If in the block 706, the processor 308 determines that the selectable noise filter 312 is ON, then the process 700 passes to the block 712 to determine whether the read rate is increasing or decreasing.

If in the block 708, the processor 308 determines that the read rate is not less than the predetermined value, then the process passes to the block 714 and the processor 308 keeps the selectable noise filter 312 is OFF.

Referring back to FIG. 5, a schematic diagram of the selectable noise filter 312 is illustrated. In the illustrated embodiment, the noise filter 312 includes resistors R32 and R42, (1 KΩ), a capacitor C15, and a metal oxide semiconductor field-effect transistor (MOSFET) Q5. R32, R42, C15, and MOSFET Q5 work in combination with existing resistor R8 to form the noise filter 312, which allows a selected range of frequencies within the analog signal 202/203 to pass, while preventing the unwanted paper and noise frequencies from passing.

In the illustrated embodiment the MOSFET Q5 is a switch controlled by the processor 308 to select or deselect the noise filter 312 from the circuitry in the signal conditioner 300. R42 is a pull-down resistor. R8, C15, and R32 determine the frequency point and attenuation factor of the filter. When the signal from the processor 308 is sufficient to turn the MOSFET Q5 ON, then the selectable noise filter 312 will filter noise within its bandwidth. In one embodiment, the selectable noise filter 312 filters out the noise 240 on the analog signal 202/203.

In an alternative embodiment, Q5 can be a JFET switch controlled by the processor 308 to select or deselect the noise filter 312 from the circuitry in the signal conditioner 300. In this embodiment, Q5 can provide a range of attenuation levels across a range of frequencies as defined by the poles of the noise filter 312.

Although embodiments of the present invention have been described using particular frequencies and bandwidths, after reading the description herein it will be apparent how to implement embodiments of the present invention using different filter cut-off points. Moreover, the particular filter profile can be achieved using other techniques, such as active amplifier filters, passive filters, and/or digital processing filters.

Embodiments of the present invention may be implemented using hardware, software, or a combination thereof. In implementations using software, the software may be stored on a machine-accessible medium.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable and non-recordable media (e.g., read only memory (ROM), random access memory (RAM), magnetic disk storage media, optical storage media, flash memory devices, etc.), as well as electrical, optical, acoustic, or other form of propagated signals (e.g., carrier waves, infrared signals, digital signals, etc.).

In the above description, numerous specific details, such as particular processes, materials, devices, and so forth, are presented to provide a thorough understanding of embodiments of the invention. One skilled in the relevant art will recognize, however, that the embodiments of the present invention can be practiced without one or more of the specific details, or with other methods, components, etc. In other instances, well-known structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. A method, comprising:
   applying a gain to an analog signal representative of a barcode based on a predetermined amplitude for the analog signal;
   determining an amplitude of a first frequency portion of the analog signal;
   determining an amplitude of a second frequency portion of the analog signal;
   determining that the amplitude of the first frequency portion of the analog signal is approximately equal to the amplitude of the second frequency portion of the analog signal;
   determining that a noise filter is OFF;
   determining that a read rate is less than a predetermined value; and
   turning the noise filter ON in response to the read rate being less than the predetermined value.

2. The method of claim 1, further comprising determining that frequencies in the first frequency portion are lower than frequencies in the second frequency portion.

3. The method of claim 1, further comprising determining that frequencies in the first frequency portion are higher than frequencies in the second frequency portion.

4. The method of claim 1, further comprising determining that frequencies in the first frequency portion are within frequencies in the second frequency portion.

5. The method of claim 1, further comprising determining that the amplitude of the second frequency portion of the analog signal is less than the amplitude of a first frequency portion of the analog signal.

6. The method of claim 5, further comprising applying a second gain to the analog signal based on the amplitude of the first frequency portion of the analog signal.

7. The method of claim 5, further comprising applying a second gain to the analog signal based on the amplitude of the second frequency portion of the analog signal.

8. The method of claim 1, further comprising applying a second gain to the analog signal based on the predetermined amplitude for the analog signal.

9. The method of claim 1, further comprising:
   determining that the read rate increased; and
   leaving the noise filter ON in response to the increased read rate.

10. The method of claim 1, further comprising:
    determining that the read rate decreased; and
    turn the noise filter OFF in response to the decreased read rate.

11. An apparatus, comprising logic to:
    apply a first gain to an analog signal representative of a barcode based on a predetermined amplitude for the analog signal;
    determine an amplitude of a first frequency portion of the analog signal;
    determine an amplitude of a second frequency portion of the analog signal;
    determine that the amplitude of the first frequency portion of the analog signal is approximately equal to the amplitude of the second frequency portion of the analog signal; and
    determine that a noise filter is OFF, determine that a read rate is less than a predetermined value, and turn the noise filter ON in response to the read rate being less than the predetermined value.

12. The apparatus of claim 11, wherein frequencies in the first frequency portion are higher than frequencies in the second frequency portion.

13. The apparatus of claim 11, wherein frequencies in the first frequency portion are within frequencies in the second frequency portion.

14. The apparatus of claim 11, wherein the logic is further to determine that the amplitude of the second frequency portion of the analog signal is less than the amplitude of a first frequency portion of the analog signal.

15. The apparatus of claim 11, further wherein frequencies in the first frequency portion are lower than frequencies in the second frequency portion.

16. The apparatus of claim 15, wherein the logic is further to apply a second gain to the analog signal based on the amplitude of the first frequency portion of the analog signal.

17. The apparatus of claim 15, wherein the logic is further to apply a second gain to the analog signal based on the amplitude of the second frequency portion of the analog signal.

18. The apparatus of claim 11, wherein the logic is further to apply a second gain to the analog signal based on the predetermined amplitude for the analog signal.

19. The apparatus of claim 11, wherein the logic is further to determine that the read rate increased and leaving the noise filter ON in response to the increased read rate.

20. The apparatus of claim 11, wherein the logic is further to determine that the read rate decreased and to turn the noise filter OFF in response to the decreased read rate.

21. A method, comprising:
receiving at a first gain element and a second gain element a gain signal, the gain signal based on a predetermined amplitude for an analog signal representative of a barcode, the first gain element matched to the second gain element;
generating a linear response to the gain signal using the first and the second gain elements;
applying the analog signal to a positive input of an operational amplifier; and
applying the linear response to the gain signal to a negative input of the operational amplifier.

22. The method of claim 21, further comprising buffering the gain signal before receiving it at the gate of the first gain element and the second gain element.

23. The method of claim 21, further comprising filtering the analog signal before receiving it at the operational amplifier.

24. A method, comprising:
receiving at a gain element a gain signal, the gain signal based on a predetermined amplitude for an analog signal representative of a barcode, the gain element having a response;
generating a linear response to the gain signal using a map of the gain element response;
applying the analog signal to a positive input of an operational amplifier; and
applying the linear response to the gain signal to a negative input of the operational amplifier.

25. The method of claim 24, further comprising buffering the gain signal before receiving it at the gate of the first transistor and the second transistor.

26. The method of claim 24, further comprising filtering the analog signal before receiving it at the operational amplifier.

27. An apparatus, comprising:
a gain element to receive a gain signal, the gain signal based on a predetermined amplitude for a first analog signal, the first analog signal being representative of a barcode, the gain element having a response; and
a map of the gain element response, the combination of the gain element response and the map of the gain element response to generate a linear response to the gain signal; and
circuitry to apply the linear response to the first analog signal to generate a second analog signal.

28. The apparatus of claim 27, further comprising logic to buffer the gain signal before receiving it at the gate of the first gain element and the second gain element.

29. The apparatus of claim 27, wherein the logic is further to filter the analog signal before receiving it at the operational amplifier.

30. The apparatus of claim 27, wherein the gain element is a transistor.

31. The apparatus of claim 30, wherein the gain element is a FET.

32. The apparatus of claim 31, wherein the gain element is a JFET, a MOSFET, and/or a GaAs FET.

33. The apparatus of claim 30, wherein the gain element is a BJT.

34. The apparatus of claim 33, wherein the first and/or the second gain element is an HBJT.

35. The apparatus of claim 27, wherein the first and/or the second gain element is a vacuum tube.

36. An apparatus, comprising:
a first gain element and a second gain element matched to the first gain element to generate a linear response to a gain signal, the gain signal being based on a predetermined amplitude for a first analog signal, the first analog signal being representative of a barcode, wherein the first and/or the second gain element is a transistor;
circuitry to apply the linear response to the first analog signal to generate a second analog signal; and
logic to determine an amplitude of a first frequency portion of at least a portion of the second analog signal, and to determine an amplitude of a second frequency portion of at least a portion of the second analog signal.

37. The apparatus of claim 36 wherein the first and/or the second gain element is an FET.

38. The apparatus of claim 37, wherein the first and/or the second gain element is a JFET, a MOSFET, and/or a GaAs FET.

39. The apparatus of claim 36, wherein the first and/or the second gain element is a bipolar junction transistor (BJT).

40. The apparatus of claim 39, wherein the first and/or the second gain element is a heterojunction bipolar junction transistor (HBJT).

41. The apparatus of claim 36, wherein the first and/or the second gain element is a vacuum tube.

42. The apparatus of claim 36, further wherein frequencies in the first frequency portion are lower than frequencies in the second frequency portion.

43. The apparatus of claim 36, wherein frequencies in the first frequency portion are higher than frequencies in the second frequency portion.

44. The apparatus of claim 36, wherein frequencies in the first frequency portion are within frequencies in the second frequency portion.

45. The apparatus of claim 36, wherein the logic is further to determine that the amplitude of the second frequency portion of the analog signal is less than the amplitude of a first frequency portion of the analog signal.

46. The apparatus of claim 36, wherein the logic is further to apply a second gain to the analog signal based on the amplitude of the first frequency portion of the analog signal.

47. The apparatus of claim 36, wherein the logic is further to determine that the amplitude of the first frequency portion of the analog signal is approximately equal to the amplitude of the second frequency portion of the analog signal.

48. An apparatus, comprising:
a gain element having a response;
a map of the gain element response, the combination of the gain element and the map of the gain element response to generate a linear response to a gain signal, the gain signal based on a predetermined amplitude for a first analog signal, the first analog signal being representative of a barcode;
circuitry to apply the linear response to the first analog signal to generate a second analog signal; and
logic to determine an amplitude of a first frequency portion of at least a portion of the second analog signal, and to determine an amplitude of a second frequency portion of at least a portion of the second analog signal.

49. The apparatus of claim 48, wherein the gain element is a transistor.

50. The apparatus of claim 49, wherein the gain element is an FET.

51. The apparatus of claim 50, wherein the gain element is a JFET, a MOSFET, and/or a GaAs FET.

52. The apparatus of claim 49, wherein the gain element is a bipolar junction transistor (BJT).

53. The apparatus of claim 52, wherein the gain element is a heterojunction bipolar junction transistor (HBJT).

54. The apparatus of claim 48, wherein the gain element is a vacuum tube.

55. The apparatus of claim 48, further wherein frequencies in the first frequency portion are lower than frequencies in the second frequency portion.

56. The apparatus of claim 48, wherein frequencies in the first frequency portion are higher than frequencies in the second frequency portion.

57. The apparatus of claim 48, wherein frequencies in the first frequency portion are within frequencies in the second frequency portion.

58. The apparatus of claim 48, wherein the logic is further to determine that the amplitude of the second frequency portion of the analog signal is less than the amplitude of a first frequency portion of the analog signal.

59. The apparatus of claim 48, wherein the logic is further to apply a second gain to the analog signal based on the amplitude of the first frequency portion of the analog signal.

60. The apparatus of claim 48, wherein the logic is further to determine that the amplitude of the first frequency portion of the analog signal is approximately equal to the amplitude of the second frequency portion of the analog signal.

61. An apparatus, comprising:
a first gain element to receive a gain signal, the gain signal based on a predetermined amplitude for an analog signal representative of a barcode;
a second gain element to receive the gain signal, the first gain element matched to the second gain element, the combination of the first and the second gain elements to generate a linear response to the gain signal;
circuitry to apply the linear response to the gain signal; and
logic to buffer the gain signal before receiving it at the gate of the first gain element and the second gain element.

62. The apparatus of claim 61, wherein the logic is further to filter the analog signal before receiving it at the operational amplifier.

63. An apparatus, comprising:
a first gain element to receive a gain signal, the gain signal based on a predetermined amplitude for an analog signal representative of a barcode;
a second gain element to receive the gain signal, the first gain element matched to the second gain element, the combination of the first and the second gain elements to generate a linear response to the gain signal, wherein the first and/or the second gain element is a transistor; and
circuitry to apply the linear response to the gain signal.

64. The apparatus of claim 63, further comprising logic to buffer the gain signal before receiving it at the gate of the first gain element and the second gain element.

65. The apparatus of claim 63, wherein the logic is further to filter the analog signal before receiving it at the operational amplifier.

66. The apparatus of claim 63, wherein the first and/or the second gain element is an FET.

67. The apparatus of claim 66, wherein the first and/or the second gain element is a JFET, a MOSFET, and/or a GaAs FET.

68. The apparatus of claim 63, wherein the first and/or the second gain element is a bipolar junction transistor (BJT).

69. The apparatus of claim 68, wherein the first and/or the second gain element is a heterojunction bipolar junction transistor (HBJT).

70. An apparatus, comprising:
a first gain element to receive a gain signal, the gain signal based on a predetermined amplitude for an analog signal representative of a barcode;
a second gain element to receive the gain signal, the first gain element matched to the second gain element, the combination of the first and the second gain elements to generate a linear response to the gain signal, wherein the first and/or the second gain element is a vacuum tube; and
circuitry to apply the linear response to the gain signal.

* * * * *